Patented Nov. 21, 1939

2,181,057

UNITED STATES PATENT OFFICE 2,181,057

AZO DYESTUFFS

Hans Krzikalla and Wolfgang Alt, Ludwigshafen-on-the-Rhine, Germany, assignors to General Aniline Works, Inc., New York, N. Y., a corporation of Delaware No Drawing. Application May 5, 1938, Serial No. 206,204. In Germany May 24, 1937

11 Claims. (Cl. 260—184)

The present invention relates to new azo dyestuffs.

We have found that valuable azo dyestuffs can be obtained by coupling aromatic diazo compounds with ortho-hydroxy aryl carboxylic acid arylides of the general formula

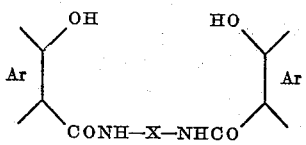

wherein Ar stands for an aromatic radicle and X for an arylene radicle containing at least one externally bound salt-like radicle imparting water-solubility, or by introducing such radicle into a ready-made dyestuff of the above identified nature.

The salt-like radicles imparting water-solubility may be, for example, sulphonic acid or carboxylic acid groups saturated by an alkali metal, ammonia or an amine, or also a quaternary ammonium group. This group may also contain different kinds of organic radicles on the nitrogen. The externally bound salt-like radicle should be attached to the arylide portion of the ortho-hydroxycarboxylic acid arylide by an open carbon chain or by a cyclic carbon containing radicle either directly or indirectly for example by a bridge —O—, —S—, —NR— (R being hydrogen or an organic radicle),

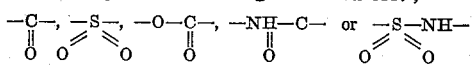

The dyestuffs are prepared by reacting aromatic diazo compounds with ortho-hydroxycarboxylic acid arylides containing at least one radicle of the said kind, or by introducing such radicles after the coupling. When the arylide contains an aliphatic radicle with a reactive substituent, this may be replaced by a salt-forming group of the same kind.

For example, 2 molecular proportions of an ortho-hydroxycarboxylic acid, its chloride or esters, which are capable of coupling, may be caused to react with 1 molecular proportion of a benzene derivative:

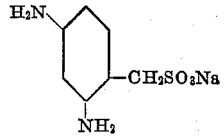

(obtainable by causing dinitrobenzylchloride to react with sodium sulphite, and reducing the reaction product) or a corresponding benzidine derivative:

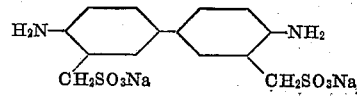

(obtainable by causing ortho-nitrobenzylchloride to react with sodium sulphite, reducing in alkaline medium and rearranging the hydrazo compound formed) to form the mono-amide or diamide, the said amides being coupled with diazo compounds. In the same way there may first be prepared from the amino compounds:

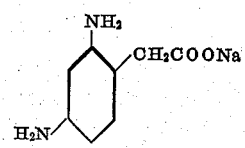

(obtainable by causing dinitrobenzylchloride to react with potassium cyanide, saponifying the nitrile and reducing the acid),

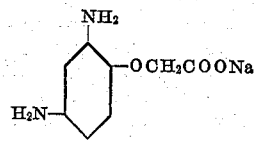

(obtainable by causing dinitrophenol to react with mono-chloracetic acid and reducing),

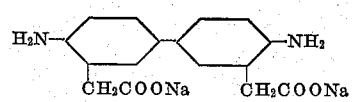

(obtainable by causing ortho-nitrobenzylchloride to react with potassium cyanide, saponifying, reducing the acid in alkaline medium and rearranging the hydrazo compound) or

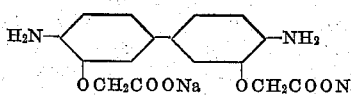

(obtainable by causing ortho-nitrophenol to react with mono-chloracetic acid, reducing in alkaline medium, and rearranging the hydrazo compound), the ortho-hydroxycarboxylic acid diarylides, the dyestuffs being obtained therefrom by coupling with diazo compounds.

As examples of the subsequent introduction of a solubilizing group there may be mentioned the following reactions:

The diamides derived from ortho-hydroxycarboxylic acids, capable of coupling, and omega-hydroxyethoxyanilines:

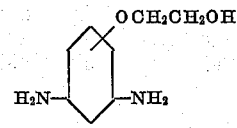

(obtainable by causing dinitrophenol to react with ethylene-chlorhydrin in alkaline medium, and reducing) or the corresponding diaminodiphenyls:

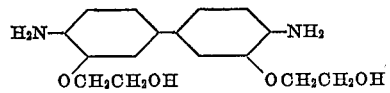

(obtainable by causing ortho-nitrophenol to react with ethylene-chlorhydrin in alkaline medium, reducing in alkaline medium and rearranging), may be reacted with diazo compounds to form dyestuffs, whereupon the solubilizing groups are introduced by esterification of the omega-hydroxyl groups with sulphuric acid or chlorsulphonic acid. This esterification may also be carried out with the amides, the resulting substances then being coupled with diazo compounds; finally it is also possible to esterify the original amino compounds:

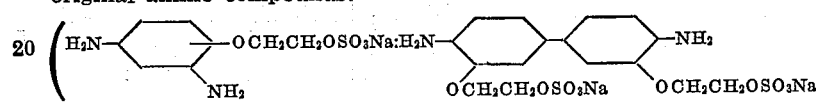

and then to carry out first the amide reaction and then the coupling.

Suitable ortho-hydroxyarylcarboxylic acid diarylides may be derived, for example, from 2-hydroxynaphthalene - 3 - carboxylic acid, 2 - hydroxy-6-methoxynaphthalene-3-carboxylic acid, 2-hydroxyanthracene - 3 - carboxylic acid, 2-hydroxy-diphenylene oxide-3-carboxylic acid, 2-hydroxycarbazole-3-carboxylic acid and 7,8-benzocarbazole-bz-3-hydroxy- 2 -carboxylic acid. The diazo components used in our process may be the aromatic amines, usually employed for the production of azo dyestuffs, such as aminobenzene, nitro-aminobenzenes, nitro-aminophenols, aminodiphenylamines, aminoazobenzenes which may contain further substituents such as halogen, alkyl, fluoralkyl, alkoxy and sulfonalkyl groups, or carboxylic and sulfonic acid groups.

The azo dyestuffs thus obtainable are distinguished by specially good fastness to light. They have pronounced affinity for animal fibers, such as wool, silk and leather, and also for cellulosic fibers. It may be preferable to produce the dyestuffs on the fiber by applying to the fiber the said hydroxyaroyldiamides, which in this case must naturally already contain the salt-forming groups, and developing them thereon with diazo compounds. In this manner excellent fast dyeings, level on the fibers, may also be obtained on mixtures of different fibers, as, for example, on mixed fabrics or mixed yarns, especially those of wool and regenerated cellulose (as for example viscose artificial silk).

The following examples will serve to further illustrate how our invention may be carried out in practice, but the invention is not restricted to these examples. The parts are by weight unless otherwise stated.

*Example 1*

2-acetoxynaphthalene-3-carboxylic acid chloride is converted with 4,4'-diaminodiphenyl-3,3'-di-omega-methane sulphonic acid sodium salt in aqueous solution rendered alkaline with bicarbonate into the diamido compound, the two acetyl groups are split off by a short treatment with caustic soda solution and the resulting diamido compound, having the constitution:

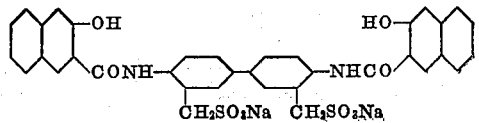

is separated from the weakly bicarbonate-alkaline liquid, if necessary by salting out.

A mixed fabric of 70 per cent of wool and 30 per cent of viscose artificial silk is treated for an hour at 90° C. with 3 per cent of the disodium salt of the said diamide with an addition of 20 per cent of Glauber's salt (amounts being with reference to the weight of fiber). The bath is exhausted to a great extent. After rinsing, the fabric is introduced for half an hour in a neutral solution of the diazonium salt of 4-chlor-2-nitro-1-aminobenzene. A powerful red dyeing of excellent fastness to light and very good fastness to moisture is obtained.

By using a neutral solution of diazotized 4-amino-4'-methoxydiphenylamine instead of the said diazo compound, a beautiful navy-blue dyeing of excellent fastness is obtained.

*Example 2*

The diamido compound of the constitution:

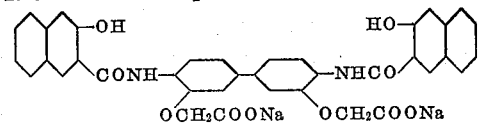

is prepared by the method described in Example 1 from 2-acetoxy-naphthalene-3-carboxylic acid chloride and the sodium salt of 4,4'-diamino-3,3'-di(ω-carboxymethoxy) diphenyl. A mixed fabric of 75 per cent of wool and 25 per cent of viscose artificial silk is treated for an hour at 90° C. with 3 per cent of the disodium salt of the said diamide with an addition of 20 per cent of Glauber's salt. The bath is strongly exhausted. After rinsing the fabric is brought into a neutral solution of diazotized 4-chlor-2-amino-1-methylbenzene for half an hour. There is produced a uniform red-brown dyeing having excellent fastness properties.

By using, instead of the said diamide, the corresponding derivative of 4,4'-diaminodiphenyl-3,3'-diacetic acid sodium salt having the constitution:

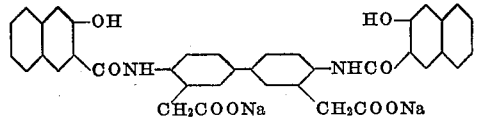

and carrying out the development with the same diazo compound, there is obtained a beautiful red dyeing having a similar good fastness.

*Example 3*

Wool slivers are treated for an hour at from 60° to 80° C. in a bath having a bath ratio of 1:30 with 3 per cent of the compound of the constitution:

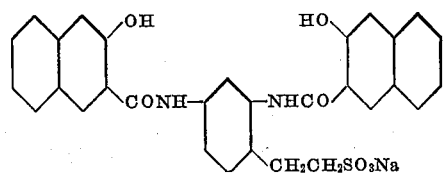

(prepared from diaminophenylethane-ω-sulphonic acid, which, in turn, may be obtained by dinitrating the acetyl compound of phenylethyl alcohol, saponifying of the acetyl group, treating with a phosphorus halide, causing the dinitrophenylethyl halide to react with sodium sulphite, and reducing). The bath is practically completely exhausted. After rinsing with cold water, there is obtained with a neutral solution of diazotized para-aminodiphenylamine a blue dyeing of very good fastness properties.

Dyeings of similar fastness are obtained by using, instead of the said compounds, compounds of the constitution:

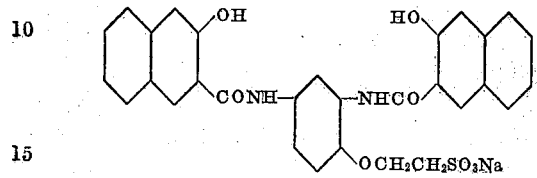

(the diaminophenoxyethane-ω-sulphonic acid may be prepared by causing dinitrophenoxy ethyl alcohol to react with phosphorus halides, treating the ω-halogen compound with sodium sulphite, and reducing) or

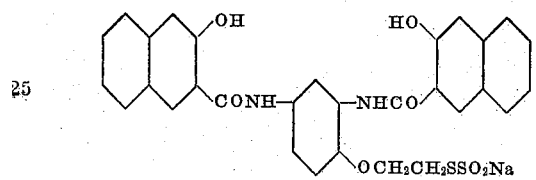

(the diaminophenoxyethane-ω-thiosulphonic acid may be prepared by treating dinitrophenoxy ethyl-ω-halide with sodium thiosulphate, and reducing)
or

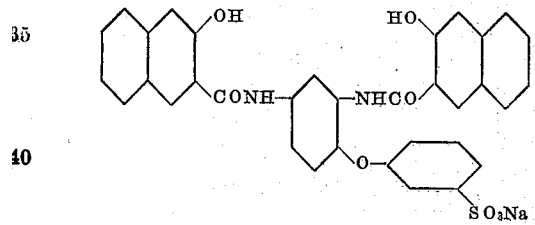

(the diaminodiphenyl ether-3'-sulphonic acid may be prepared by causing dinitrochlorbenzene to react with phenol sulphonic acid in alkaline medium).

*Example 4*

Natural silk fabric is treated at 80° C. in an aqueous bath in the ratio 1:30 for an hour with 2 per cent of the compound having the constitution:

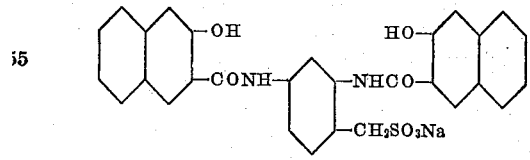

After rinsing with cold water, the fabric is treated with a neutral solution of diazotized meta-chloraniline. A red-orange dyeing of excellent fastness is thus obtained.

Quite similar dyeings of somewhat more covering shades are obtained by using the compound:

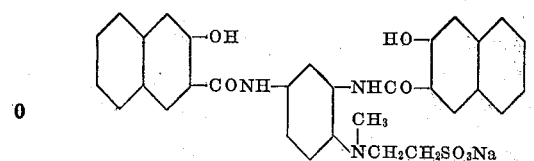

(N-(2,4'-diaminophenyl)-methyl taurine may be prepared by treating dinitrochlorbenzene with N-methyl taurine and reducing).

*Example 5*

Viscose artificial silk or cellular wool in a loose, spun or woven form is treated for an hour at 80° C. in a neutral bath of a bath ratio of 1:30 with an addition of 20 per cent of Glauber's salt with 3 per cent of the compound having the constitution:

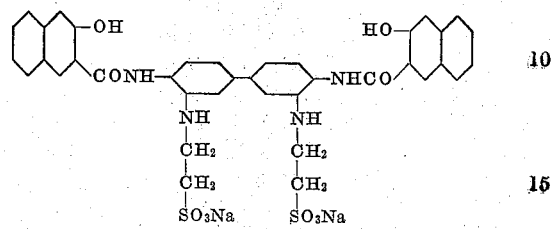

(The benzidine compound may be prepared by causing ortho-nitrochlorbenzene to react with taurine, reducing in alkaline medium and rearranging). After rinsing with cold water, the goods are treated in a neutral solution of the further diazotized monoazo dyestuff derived from diazotized nitraniline and aminohydroquinone dimethyl ether. A deep black of excellent fastness properties is obtained.

Quite a similar black dyeing is obtained by using the compound having the constitution:

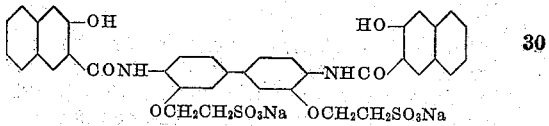

Beautiful fast brown shades are obtained with the compound:

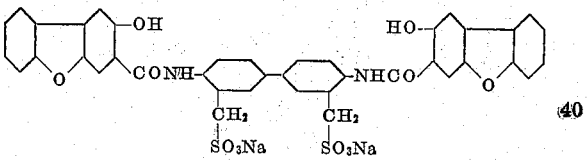

if it be brought onto the fiber and coupled thereon with diazotized 4-chlor-2-nitro-1-aminobenzene or 2,5-dichlor-1-aminobenzene.

*Example 6*

A mixed fabric of 70 per cent of wool and 30 per cent of viscose artificial silk is treated at 90° C. for one hour in a bath having a bath ratio of 1:30 under the addition of from 2 to 5 per cent of acetic acid and 50 per cent of Glauber's salt with 3 per cent of the arylide

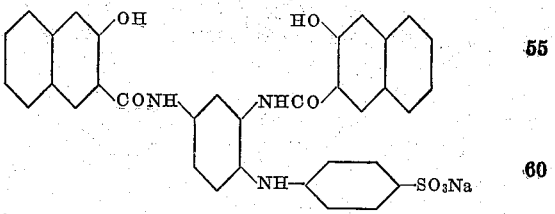

(2,4 - diaminodiphenylamine - 4' - sulphonic acid may be obtained by causing dinitrochlorbenzene to react with sulphanilic acid in alkaline medium and reducing.) The bath is strongly exhausted. After rinsing with cold water, the dyestuff is developed by treating the fabric with a neutral solution of diazotized 4-methoxy-4'-aminodiphenylamine. Beautiful blue dyeings having excellent fastness properties are obtained.

*Example 7*

A mixed fabric of 50 per cent of wool and 50 per cent of viscose artificial silk is treated at 90° C. for one hour in a bath having a bath ratio of 1:30 under the addition of from 2 to 5 per cent of acetic acid, which is added in small batches in the course of the first half hour, with 3 per cent of the arylide

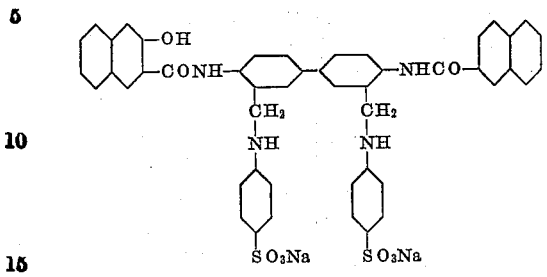

(3,3'-di(4''-sulphophenylamino)-methyl-4,4'-diaminodiphenyl may be prepared by causing ortho-nitrobenzyl chloride to react with sulphanilic acid, reducing in alkaline medium and rearranging of the hydrazo compound.) The bath is almost completely exhausted. After having rinsed for a short time, the dyestuff is developed by treating the fabric with a neutral solution of diazotized para-nitraniline. Red dyeings of valuable fastness properties are thus obtained.

*Example 8*

A mixed fabric of 70 per cent of wool and 30 per cent of viscose artificial silk is treated at 90° C. in a bath having a bath ratio of 1:20 for one hour with 5 per cent of the compound

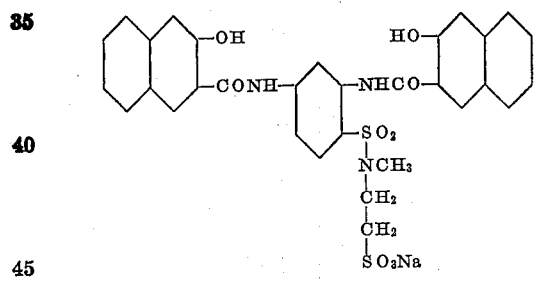

(Diaminobenzene-sulphonic acid methyl taurid may be prepared by treating dinitrobenzene-sulphochloride with N-methyltaurine and reducing.) At the beginning of the treatment 20 per cent of Glauber's salt have been added, additional 10 per cent thereof being added after half an hour. The bath is then allowed to cool while still moving the fabric therein. After having rinsed with cold water, then with a 10 per cent aqueous acetic acid solution and again with water, the fabric is brought for half an hour into a neutral solution of diazotized 4-methoxy-4'-aminodiphenyl amine.

The dyeings obtained are then treated at 80° C. in an aqueous bath, containing 5 grams of Marseillan soap per liter, for 20 minutes. Very level, clear blue shades of excellent fastness properties are thus obtained.

What we claim is:
1. Azo dyestuffs of the general formula

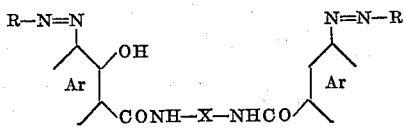

wherein R and Ar represent aromatic radicles, and wherein X stands for an arylene radicle containing at least one salt forming member of the group consisting of sulphonic and carboxylic acid groups which groups are externally attached to the arylene radicle by means of an aliphatic chain.

2. Azo dyestuffs of the general formula

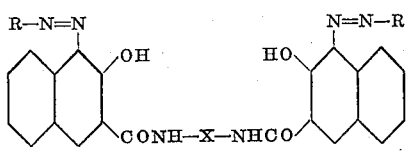

wherein R represents an aromatic radicle, and wherein X stands for an arylene radicle containing at least one salt forming member of the group consisting of sulphonic and carboxylic acid groups which groups are externally attached to the arylene radicle by means of an aliphatic chain.

3. Azo dyestuffs of the general formula

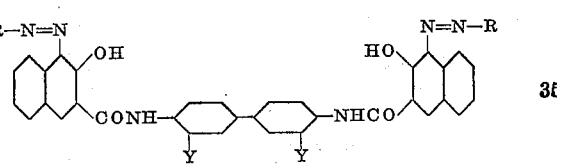

wherein R represents an aromatic radicle, and wherein the diphenylene radicle shown contains externally attached to each of the positions marked Y by means of an aliphatic chain one salt forming member of the group consisting of sulphonic and carboxylic acid groups.

4. Azo dyestuffs of the general formula

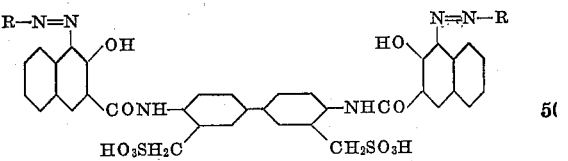

wherein R represents an aromatic radicle.

5. The azo dyestuff of the formula

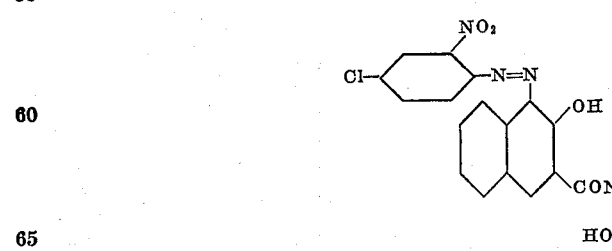

6. Azo dyestuffs of the general formula

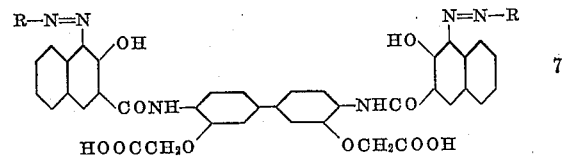

wherein R represents an aromatic radicle.

7. The azo dyestuff of the formula

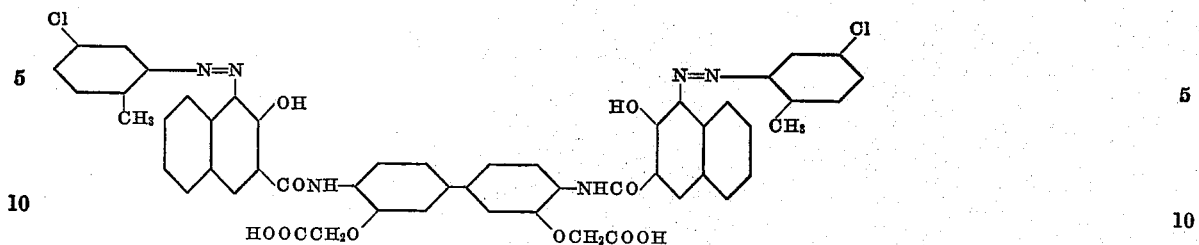

8. Azo dyestuffs of the general formula

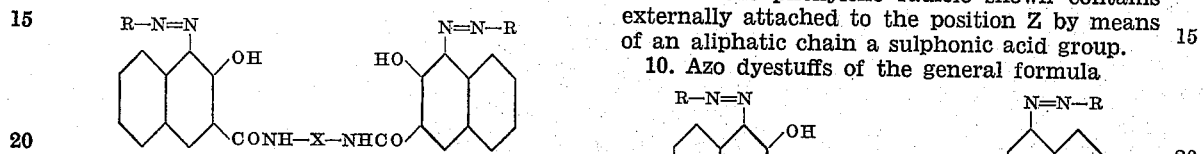

wherein R represents an aromatic radicle and wherein X represents a phenylene radicle containing one salt forming member of the group consisting of sulphonic and carboxylic acid groups which groups are externally attached to the arylene radicle by means of an aliphatic chain.

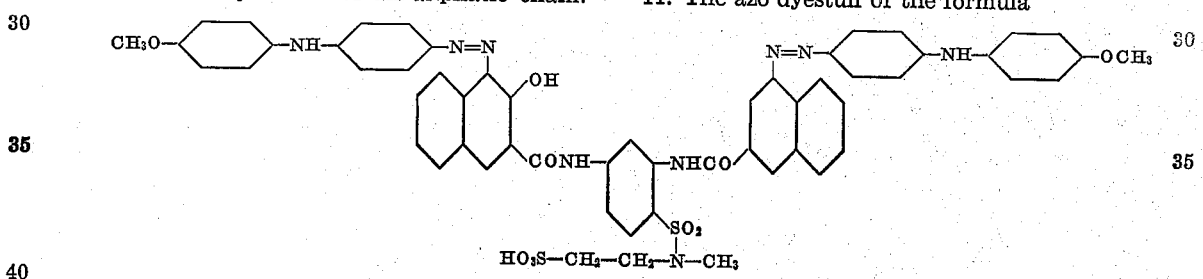

9. Azo dyestuffs of the general formula

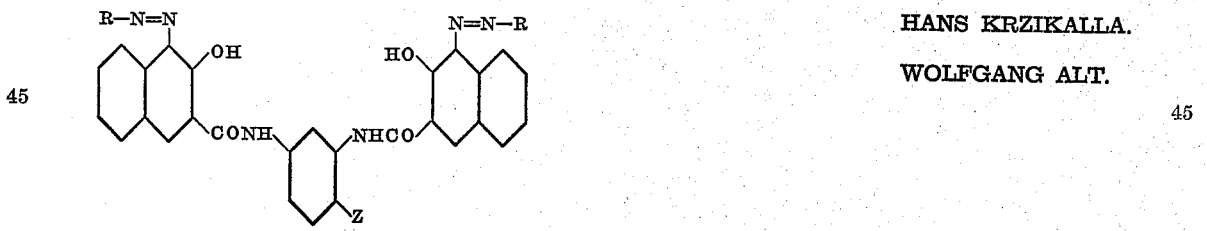

wherein R represents an aromatic radicle, and wherein the phenylene radicle shown contains externally attached to the position Z by means of an aliphatic chain a sulphonic acid group.

10. Azo dyestuffs of the general formula

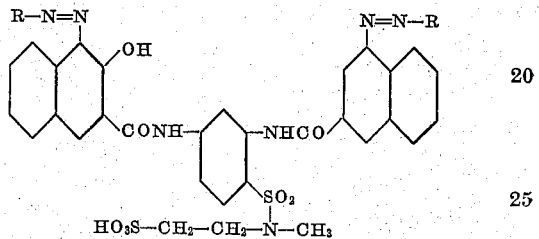

wherein R represents an aromatic radicle.

11. The azo dyestuff of the formula

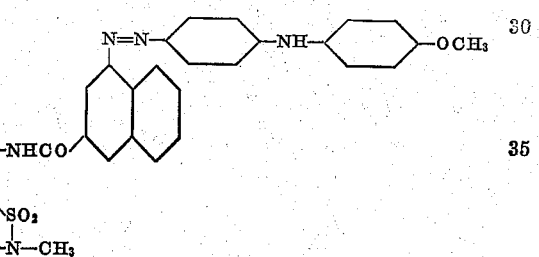

HANS KRZIKALLA.
WOLFGANG ALT.